(12) United States Patent
Wynn, II (10) Patent No.: US 7,025,336 B2
(45) Date of Patent: Apr. 11, 2006

(54) APPARATUS FOR REMOVING PARTICULATES FROM A GAS STREAM

(76) Inventor: Richard Wynn, II, 1846 Old Welsh Rd., Abington, PA (US) 19001

( * ) Notice: Subject to any disclaimer, the term of this patent is extended or adjusted under 35 U.S.C. 154(b) by 0 days.

(21) Appl. No.: 10/653,758

(22) Filed: Sep. 3, 2003

(65) Prior Publication Data
US 2005/0046053 A1 Mar. 3, 2005

(51) Int. Cl.
B01F 3/04 (2006.01)
(52) U.S. Cl. .................... 261/30; 261/123; 96/256; 96/296; 96/326; 96/331; 96/354; 96/370
(58) Field of Classification Search ............. 96/239, 96/256, 274, 275, 276, 278, 279, 296, 300, 96/326, 329, 330, 331, 333, 334, 345, 346, 96/354, 370, 291; 261/30, 122.1, 123, DIG. 9, 261/120
See application file for complete search history.

(56) References Cited

U.S. PATENT DOCUMENTS

| | | | | |
|---|---|---|---|---|
| 1,363,859 A | * | 12/1920 | Fetters et al. | 96/240 |
| 1,994,766 A | * | 3/1935 | Heglar | 96/279 |
| 2,409,558 A | * | 10/1946 | Gunn | 95/200 |
| 3,414,248 A | * | 12/1968 | Mitsuji et al. | 261/122.1 |
| 3,425,191 A | * | 2/1969 | Butz | 96/237 |
| 3,525,309 A | | 8/1970 | Katz | |
| 3,673,769 A | | 7/1972 | Gleason | |
| 3,700,216 A | | 10/1972 | Uitti | |
| 3,803,813 A | * | 4/1974 | Yuzawa | 96/131 |
| 3,957,466 A | | 5/1976 | Coppola | |
| 4,105,723 A | | 8/1978 | Mix | |
| 4,172,865 A | * | 10/1979 | Steier | 261/62 |
| 5,141,538 A | * | 8/1992 | Derington et al. | 96/329 |
| D360,460 S | | 7/1995 | Perrault et al. | |
| 5,641,338 A | | 6/1997 | Brookman | |
| 5,660,616 A | * | 8/1997 | Choi et al. | 95/213 |
| 5,759,505 A | * | 6/1998 | Nolin et al. | 423/243.08 |
| 6,076,813 A | | 6/2000 | Yeoman et al. | |
| 6,562,106 B1 | * | 5/2003 | Campbell | 95/226 |

FOREIGN PATENT DOCUMENTS

JP 56-102922 * 8/1981

OTHER PUBLICATIONS

Rand Bright Corporation, "Wet Dust Collection Systems"(3 pages).
WetAer Wave—Wet Dust Collector (3 pages).

* cited by examiner

Primary Examiner—Scott Bushey
(74) Attorney, Agent, or Firm—Wiliam H. Eilberg (57) ABSTRACT

Particulates are removed from a gas stream by contact with a liquid. The gas stream is conveyed through an inlet channel, towards a liquid reservoir which is located below a perforated sheet. Gas flowing through holes in the sheet creates a pressure drop between the inlet channel and an outlet area above the sheet. This pressure drop draws liquid up from the reservoir, through a relatively narrow liquid transfer channel, so that the liquid covers the sheet. Gas flowing through holes in the sheet therefore encounters a layer of liquid located immediately above the sheet. Particulates in the gas are captured by the liquid in this layer. The device requires no pump for moving the liquid through the system, the liquid being transferred solely as a result of the pressure drop induced by the flow of gas.

20 Claims, 8 Drawing Sheets

APPARATUS FOR REMOVING PARTICULATES FROM A GAS STREAM

BACKGROUND OF THE INVENTION

This invention relates to the field of environmental control, and provides a device which removes particulates or other materials from a gas stream. In particular, the present invention comprises a wet gas scrubber in which water is the preferred medium for removing contaminants from air.

Environmental concerns have prompted the development of many devices for removing contaminants from the air. Such devices are used in industry, such as in cleaning air streams before they are released to the outside through a smoke stack. They are used in commercial settings, such as in cleaning air that is exhausted from apartment buildings or office buildings. And they are also found in smaller scale applications, such as in cleaning the air in small businesses or homes.

It has long been known to remove particulates from air by contacting the air with water, and allowing the water to capture and retain the particulates. In effect, water acts as a filtration medium. Such devices are commonly known as wet scrubbers, wet dust collectors, or gas scrubbers. Examples of wet scrubbers of the prior art are given in U.S. Pat. Nos. 3,525,309, 3,673,769, 3,700,216, 3,957,466, 4,105,723, 5,641,338, and 6,076,813, the disclosures of which are incorporated by reference herein. The present invention falls into the general category of wet scrubbers.

A major disadvantage of wet gas scrubbers is that they generally require a pump to circulate water through the system. Thus, energy must be expended both on moving the gas to be cleaned through the system, and on circulating the water used as the filtration medium. Some of the scrubbers of the prior art manage to eliminate the need for a pump, but they instead substitute relatively complex structures that are costly to build, and offset the savings achieved by elimination of a pump.

The present invention provides a scrubber that does not require a pump, and which also requires little complex structure, thereby substantially boosting the efficiency of the scrubbing operation, as compared with devices of the prior art. The scrubber of the present invention is especially suited for use as a dust collector, in filtering flammable metals such as aluminum, titanium, and magnesium. It is also well suited for filtering any gas stream containing burning particulates, salts, sugars, any contaminants soluble in water, and many chemical gases such as hydrochloric acid, formaldehyde, and odor-causing gases evolved from plastics. However, the invention is not limited to use in these fields.

SUMMARY OF THE INVENTION

The present invention comprises a wet dust collector, or scrubber, having a reservoir for liquid, and an inlet channel for conveying incoming gas towards the reservoir. A perforated sheet is located above the reservoir. A relatively narrow liquid transfer channel allows liquid to flow from the reservoir towards the region above the perforated sheet.

The gas stream to be cleaned is forced or drawn into the inlet channel and towards the reservoir, and flows through the perforations in the sheet. This gas flow induces a pressure drop between the inlet channel and an outlet area above the perforated sheet. This pressure drop causes liquid to flow from the reservoir, through the liquid transfer channel, and into the region above the sheet. Thus, when the device is operating, and air is flowing through the system, the perforated sheet becomes effectively flooded by liquid that has risen from the reservoir. This flooded condition continues as long as gas is flowing through the system. The gas flowing through the perforations of necessity flows through the layer of liquid in the region above the sheet, and the particulates in the gas thereby become trapped by the liquid. The cleaned gas is withdrawn, preferably near the top portion of the device, and the particulates remaining in the water are periodically removed as sludge.

The system uses no pump for moving the liquid between the reservoir and the region above the perforated sheet. The only factor that draws the liquid from the reservoir into the region above the sheet is the pressure drop induced by the flow of the gas.

The gas can be conveyed through the system either by a blower that pushes gas into the inlet channel, or by a blower that pulls gas from the outlet area. In either case, the principle of operation is the same.

The inlet channel may include an inlet ramp that constricts the effective size of the inlet channel, and assists in initially removing large pieces of debris. The perforated sheet may extend underneath the inlet ramp, so as to maximize the available area of the sheet.

The device may also include wave breaks, above and/or below the perforated sheet, which minimize the effect of liquid waves formed in the reservoir and in the liquid located immediately above the perforated sheet.

The invention also includes the method of removing particulates from a gas stream, the method comprising conveying the gas stream into a reservoir, and allowing the gas stream to flow through the holes of a perforated sheet. Such flow causes a pressure drop that draws liquid from the reservoir, through a liquid transfer channel, and into the region above the perforated sheet. The gas is cleaned by contact with the liquid in the region above the sheet. The method requires no pump for moving liquid from the reservoir to the region above the sheet, or for any other purpose.

The present invention therefore has the primary object of providing an apparatus and method for removing particulates from a gas stream.

The invention has the further object of providing a wet dust collector or gas scrubber that does not require a pump for moving liquid through the system.

The invention has the further object of providing an economical apparatus and method for removing particulates from a gas stream.

The invention has the further object of providing a wet dust collector that reduces waves that may form in the liquid scrubbing medium.

The invention has the further object of reducing noise associated with a wet dust collector.

The invention has the further object of facilitating the removal of sludge from a wet dust collector.

The reader skilled in the art will recognize other objects and advantages of the present invention, from a reading of the following brief description of the drawings, the detailed description of the invention, and the appended claims.

DETAILED DESCRIPTION OF THE INVENTION

Figure 1:
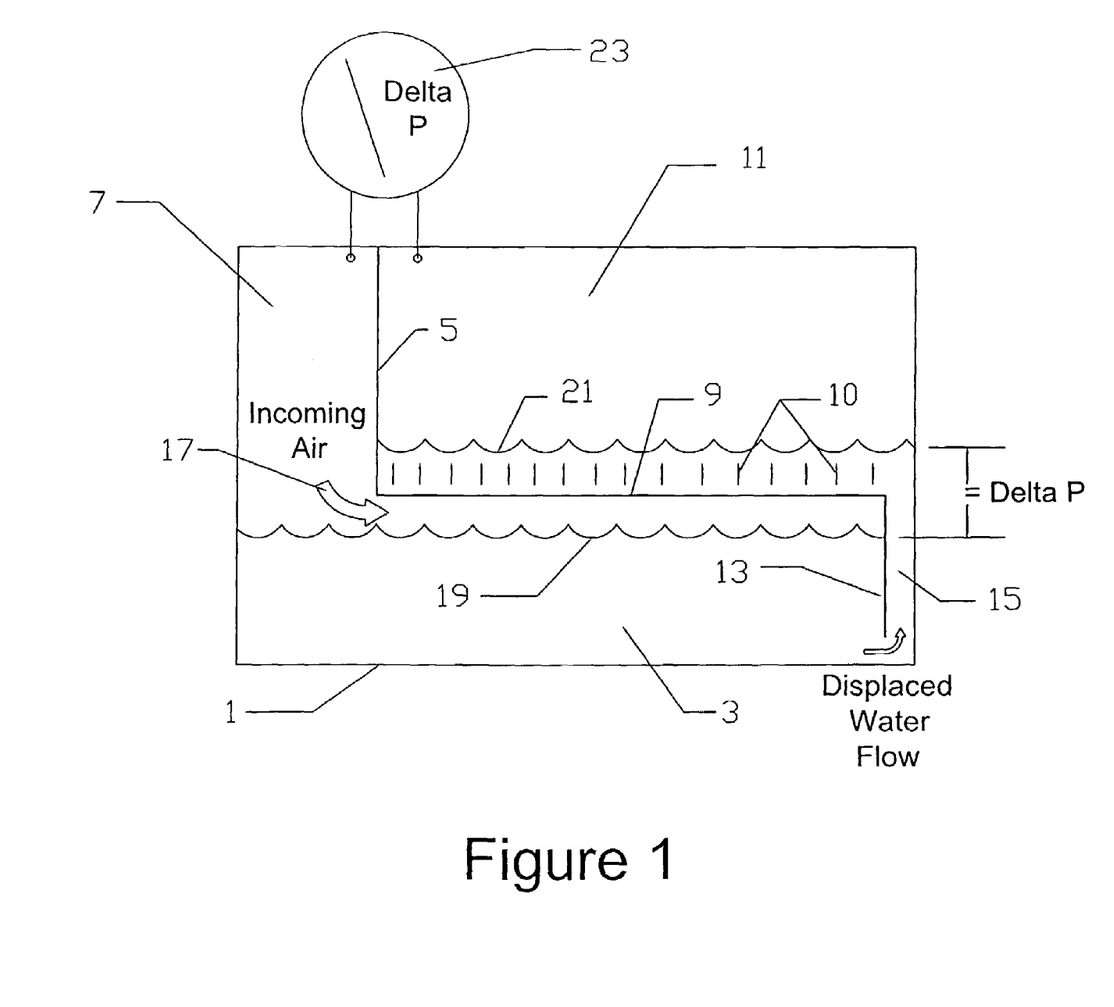
FIG. 1 provides a schematic diagram of one embodiment of the present invention, wherein air to be cleaned is pushed into the apparatus by a blower.
Figure 2:
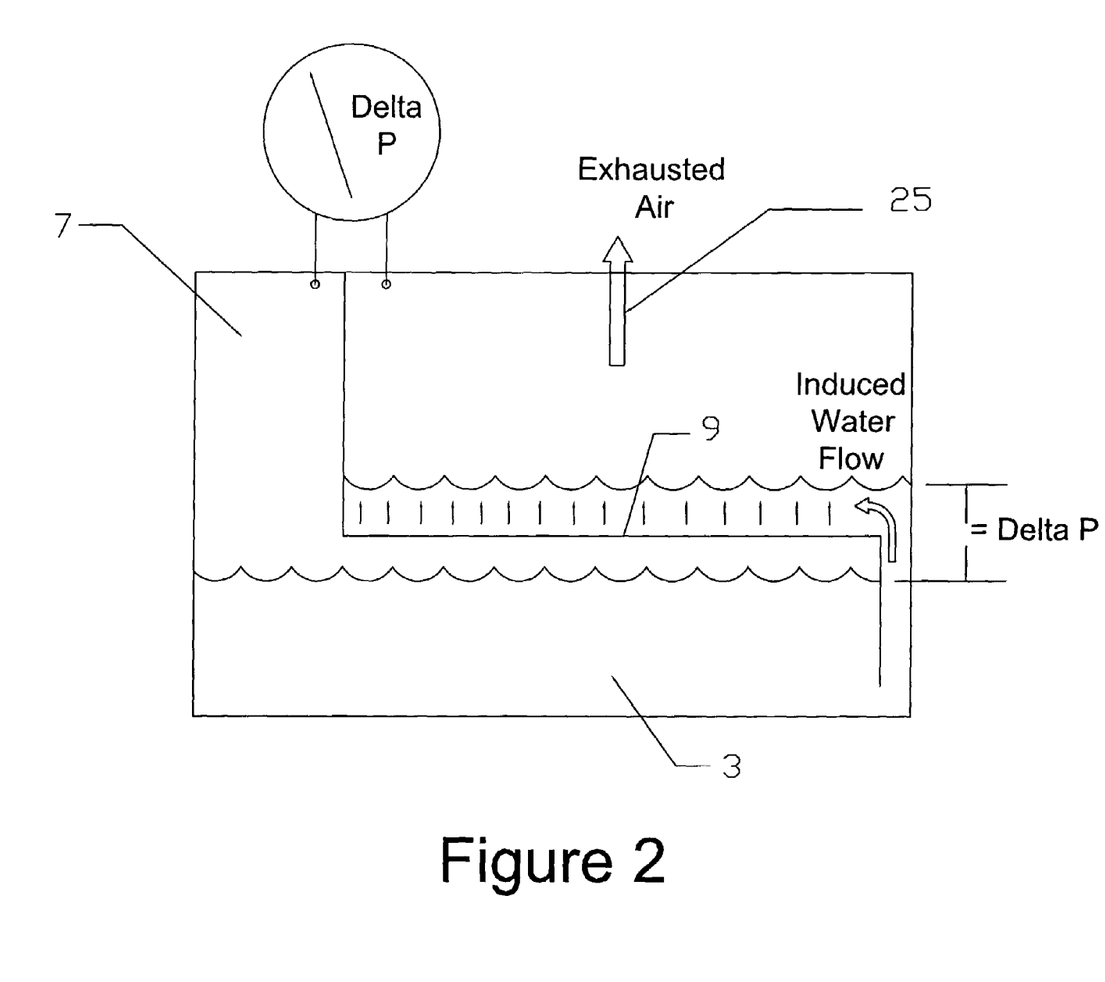
FIG. 2 provides a schematic diagram of an alternative embodiment of the invention, wherein air is drawn through the apparatus by a blower that creates negative pressure.

The schematic diagrams of FIGS. 1 and 2 show the present invention in its simplest form. A container or vessel 1 defines a sump or reservoir which holds liquid 3, which is normally water. A perforated sheet 9 lies above the reservoir. The short vertical lines 10 symbolize the air jets and bubbles, as they pass through the perforations. A baffle 5 separates inlet channel 7 from outlet area 11 above the perforated sheet. A baffle 13 defines liquid transfer channel 15. The baffle 13 does not extend to the bottom of the reservoir, thereby providing fluid communication between the reservoir and the liquid transfer channel.

As shown in the figure, the liquid transfer channel is narrow relative to the width of the reservoir. The width of the reservoir is, in general, many times the width of the liquid transfer channel.

The liquid transfer channel may take other forms. Instead of having a channel of the type shown in the drawings, one could instead use a slot, a tube, or other conduit which allows the movement of water from the sump to the area above the perforated sheet. A possible disadvantage of using a pipe is that the pipe can become clogged.

The width of the liquid transfer channel is not critical, and the invention will work with a channel having virtually any width. The only significant limitation on the size of the channel is that it be wide enough to allow the movement of water. An overly large channel will reduce the effective usable area of the perforated sheet. A channel having a width of about one-half inch is considered adequate for most applications, but the dimension is not critical, and the invention should not be deemed limited by the latter example.

Air is forced through the system by a blower, or its equivalent. The blower is symbolized by arrow 17, which shows the direction of air flow through the inlet channel 7.

Initially, the water in the reservoir may have a level as high as the perforated sheet, or even higher. The initial water level could also be lower than that of the perforated sheet.

In any case, as air is forced into the closed space below the perforated sheet and above the initial water level, the air passes through the plurality of perforations in the sheet 9, the perforations comprising orifices formed in the sheet. This flow of air through the orifices creates a pressure drop, which acts on the water in the liquid transfer channel 15, causing the water to flow through the channel and to flood the perforated sheet.

When water is transferred in this way to the region above the sheet, the water level in the reservoir falls by an amount that approximates the depth of the layer of water above the sheet. Reference numeral 19 gives an example of the water level in the reservoir while the device is in operation, and reference numeral 21 indicates an example of the level to which the water may be raised above the sheet. These levels are only examples; different operating conditions would, in general, produce different water levels.

Air flowing through the holes in the sheet therefore encounter a layer of water immediately above the sheet. The flowing air forms bubbles in this layer of water. Particulates, or other materials, entrained by the air are absorbed by the water, and the air is thereby cleaned.

The difference in the liquid levels above and below the sheet, i.e. the distance between liquid level 19 and liquid level 21, is always proportional to the pressure drop across the sheet, symbolized as Delta P. More particularly, a pressure drop, measured in units of water gauge pressure, creates a difference in water level equal to the value of the pressure drop, in inches. For example, a pressure drop of 2 inches wg creates a differential of 2 inches between the water level 19 in the reservoir and the water level 21 above the sheet. This phenomenon is further illustrated by pressure gauge 23, which measures the difference in pressure between that of outlet area 11 and that of the inlet channel 7. Note that the Delta P shown on the gauge is the same Delta P as measured by the difference in water levels.

The transfer of water from the reservoir to the outlet area 11 above the perforated sheet occurs solely due to the pressure drop caused by the flow of air through the perforations. There is no pump for moving the water from one area to the other. The only external source of motive force is the blower which pushes air through the system. When the blower is turned off, the layer of water above the sheet is no longer supported, and the water flows back into the reservoir, partly through the perforations, and partly through the liquid transfer channel, until substantially all of the water has returned to the reservoir.

The preferred speed of the blower depends on various design criteria, and there is no one optimum speed. One can obtain reasonable efficiency, with a reasonable horsepower requirement, with an air velocity through the holes of about 8000–9000 fpm. Below a velocity of about 3500 fpm, the efficiency of the device becomes poor. For velocities above 10,000 fpm, the power requirements become considerably larger, but it is possible to operate in this range by using a more powerful blower that might create air flows through the holes as large as about 25,000 fpm. In general, the system will work well between about 250 cfm and 1000 cfm per square foot of perforated sheet area, assuming that about 6% of the perforated sheet is open. If the fraction of the perforated sheet that is open (i.e. occupied by holes) is doubled to 12%, the above numbers would also be doubled.

FIG. 2 provides a schematic diagram that is similar to FIG. 1, except that air is pulled rather than pushed through the system. That is, instead of a blower forcing air towards the reservoir, a blower draws air out of the system. Arrow 25 symbolizes this blower, which creates a negative pressure that pulls air through the orifices in perforated sheet 9. The phenomenon of the rising of the water level occurs identically, regardless of whether the air is pushed through the system or drawn from the system exhaust. In FIG. 1, the water entering the liquid transfer channel 15 is deemed to be "displaced water flow". In FIG. 2, the water exiting the liquid transfer channel is called "induced water flow". The overall effects are the same for both cases. In both cases, the blower comprises means for conveying air or gas towards the reservoir and through the perforated sheet.

Figure 3:
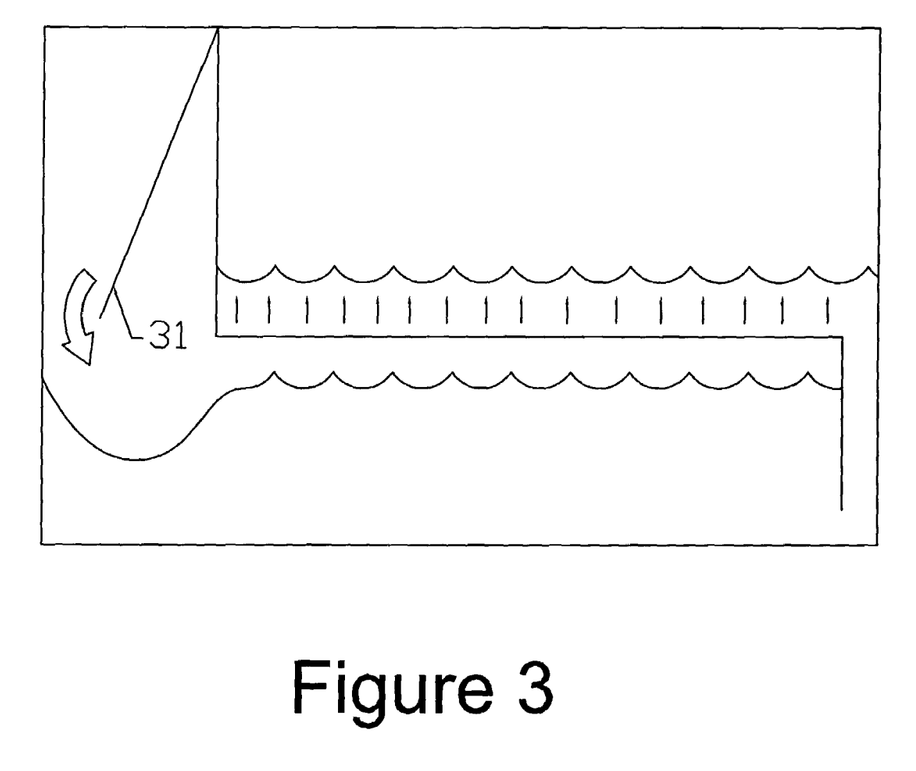
FIG. 3 provides a schematic diagram of another embodiment of the invention, wherein the size of the inlet is reduced so as to separate larger particles from the air stream to be cleaned.

FIG. 3 provides a schematic diagram of an alternative embodiment, wherein the effective size of the inlet channel is reduced by providing an inlet ramp 31. The inlet ramp constricts the inlet channel, so as to provide for initial separation of larger particles from the incoming air stream. Constricting the inlet channel also creates a venturi effect, increasing the velocity of the incoming air stream. In this embodiment, particulates in the air stream tend to impinge directly on the surface of the water.

Obviously, the smaller the size of the inlet, the better the initial separation of particles. However, a smaller inlet creates a larger pressure drop. Tests have demonstrated that a one-inch wide slot provides a suitable compromise between the desired features of enhanced separation, and a tolerable pressure drop.

Figure 4:
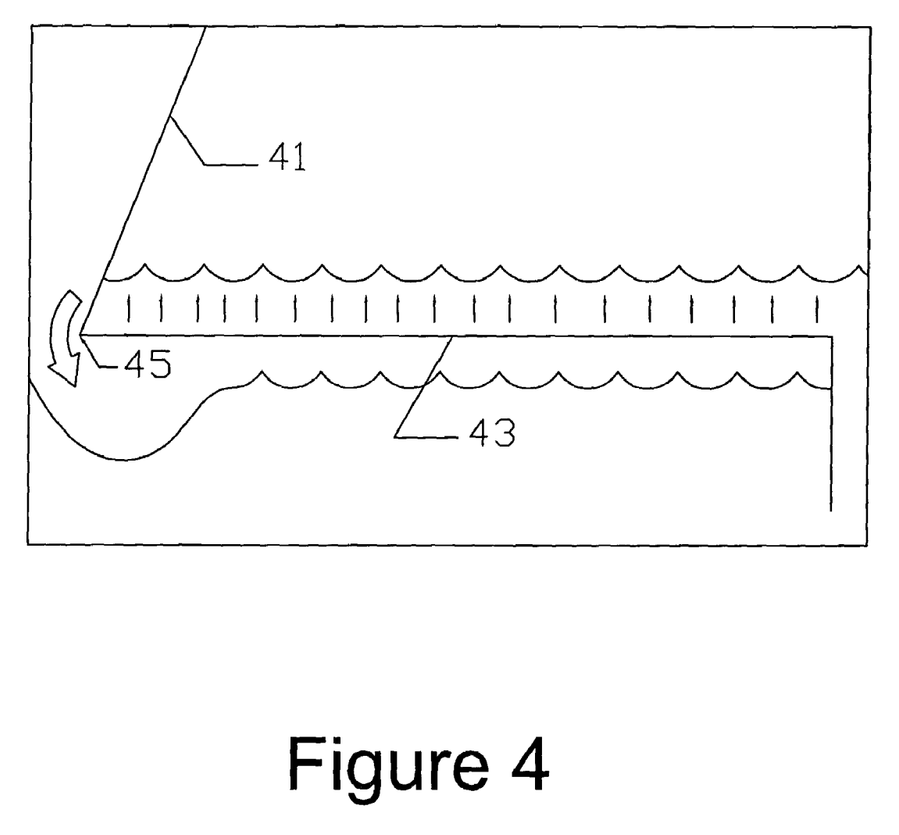
FIG. 4 provides a schematic diagram of another embodiment of the invention, wherein the space under the inlet ramp is used to enlarge the surface area of the perforated sheet.

FIG. 4 provides a schematic diagram of another embodiment, wherein the space under the inlet ramp 41 is more effectively used. In this embodiment, the perforated sheet 43 extends all the way to the point 45 of maximum constriction of the inlet ramp (i.e. to the left-hand side of FIG. 4). Thus, in this embodiment, the perforated sheet can have a greater area than in the embodiments described above, thereby enabling the system to handle additional air flow.

Figure 5:
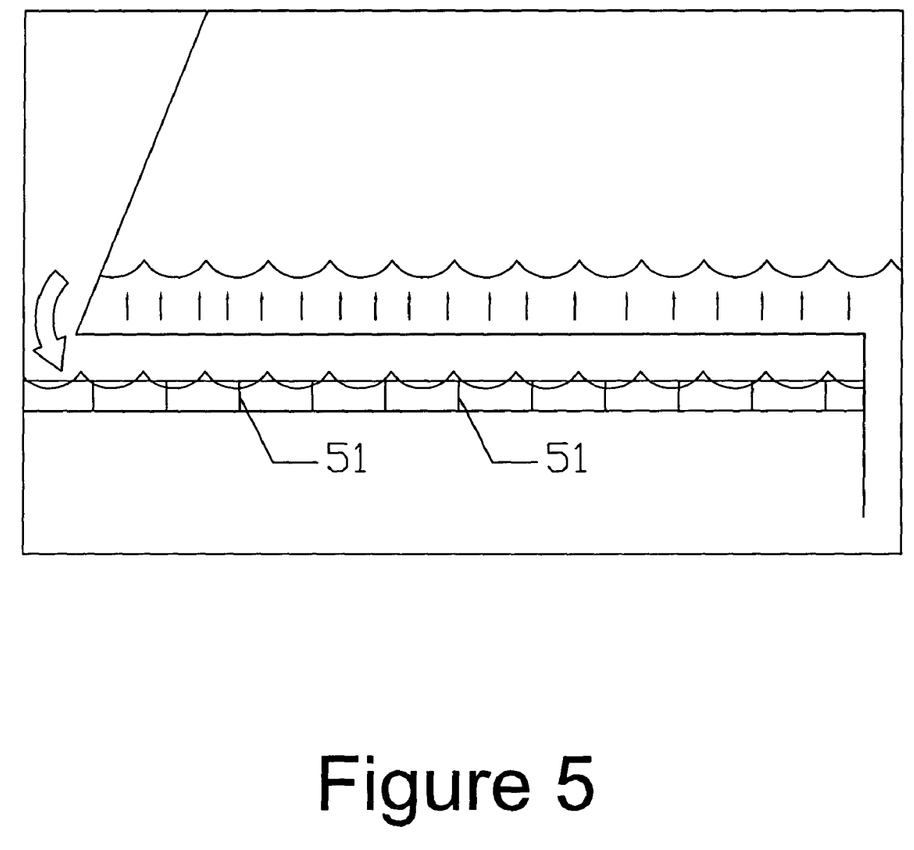
FIG. 5 provides a schematic diagram of the invention, similar to FIG. 4, with the addition of wave breaks below the water level.

FIG. 5 provides a schematic diagram of another embodiment. The airflow under the perforated sheet creates large, undesirable waves. The waves, in turn, create flow and pressure pulsations. This wave action can be controlled by providing a series of wave breaks 51 immediately below the surface of the operating water level of the reservoir. The use of the wave breaks has proven to be important in maximizing air flow through the system.

Figure 6:
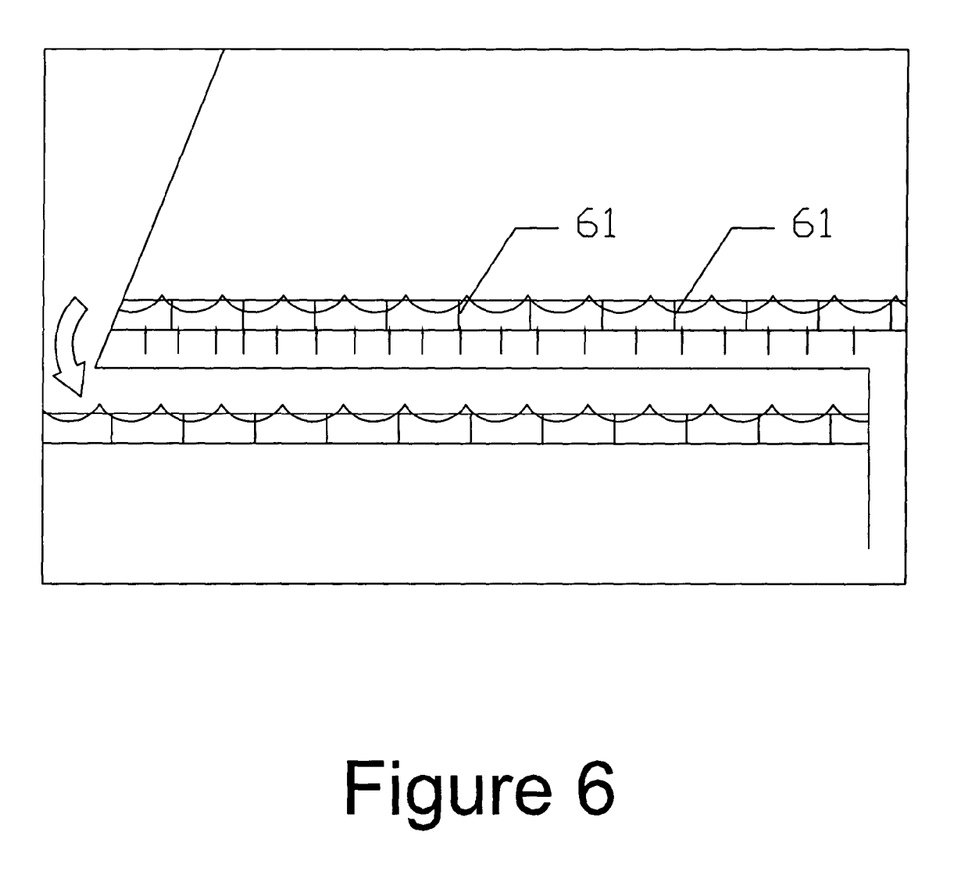
FIG. 6 provides a schematic diagram of the invention, similar to FIG. 5, with the addition of wave breaks above the perforated sheet.

The froth above the perforated sheet is also susceptible to a wave action that can reduce the efficiency of the system. This froth also creates excess mist high above the sheet. This mist is created by jets of air which pierce through thin layers of water as the level rapidly changes in small zones. This problem is reduced or eliminated by a second set of wave breaks 61, shown in the embodiment of FIG. 6. A wave break above the perforated sheet therefore further improves the system efficiency, and makes it possible to reduce the overall height of the apparatus.

Figure 7A:
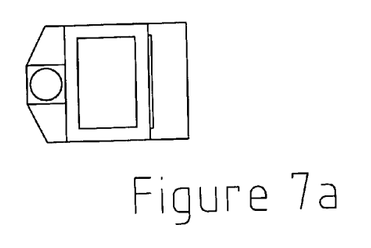
FIG. 7a provides a top view of a preferred embodiment of the apparatus of the present invention.
Figure 7B:
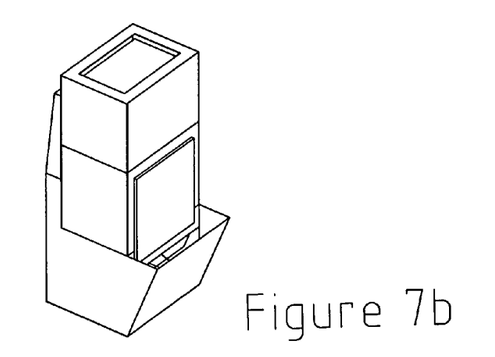
FIG. 7b provides a perspective view of a preferred embodiment of the apparatus of the present invention.
Figure 7C:
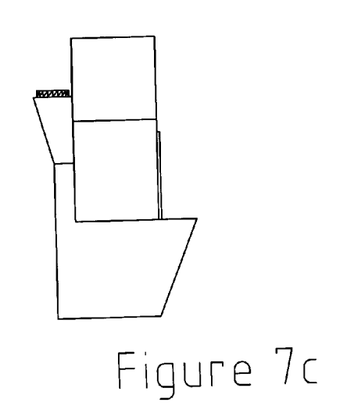
FIG. 7c provides a side elevational view of a preferred embodiment of the apparatus of the present invention.
Figure 7D:
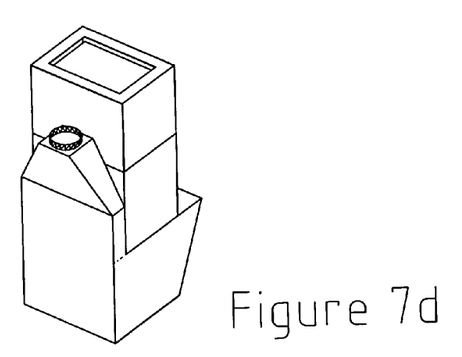
FIG. 7d provides a perspective view, from another side, of a preferred embodiment of the apparatus of the present invention.

FIGS. 7a–7d and FIG. 8 show details of a preferred embodiment of the present invention. FIGS. 7b and 7d show the device in two perspective views, taken from different directions. FIG. 7a provides a top view, and FIG. 7c shows the device in a side elevation.

Figure 8:
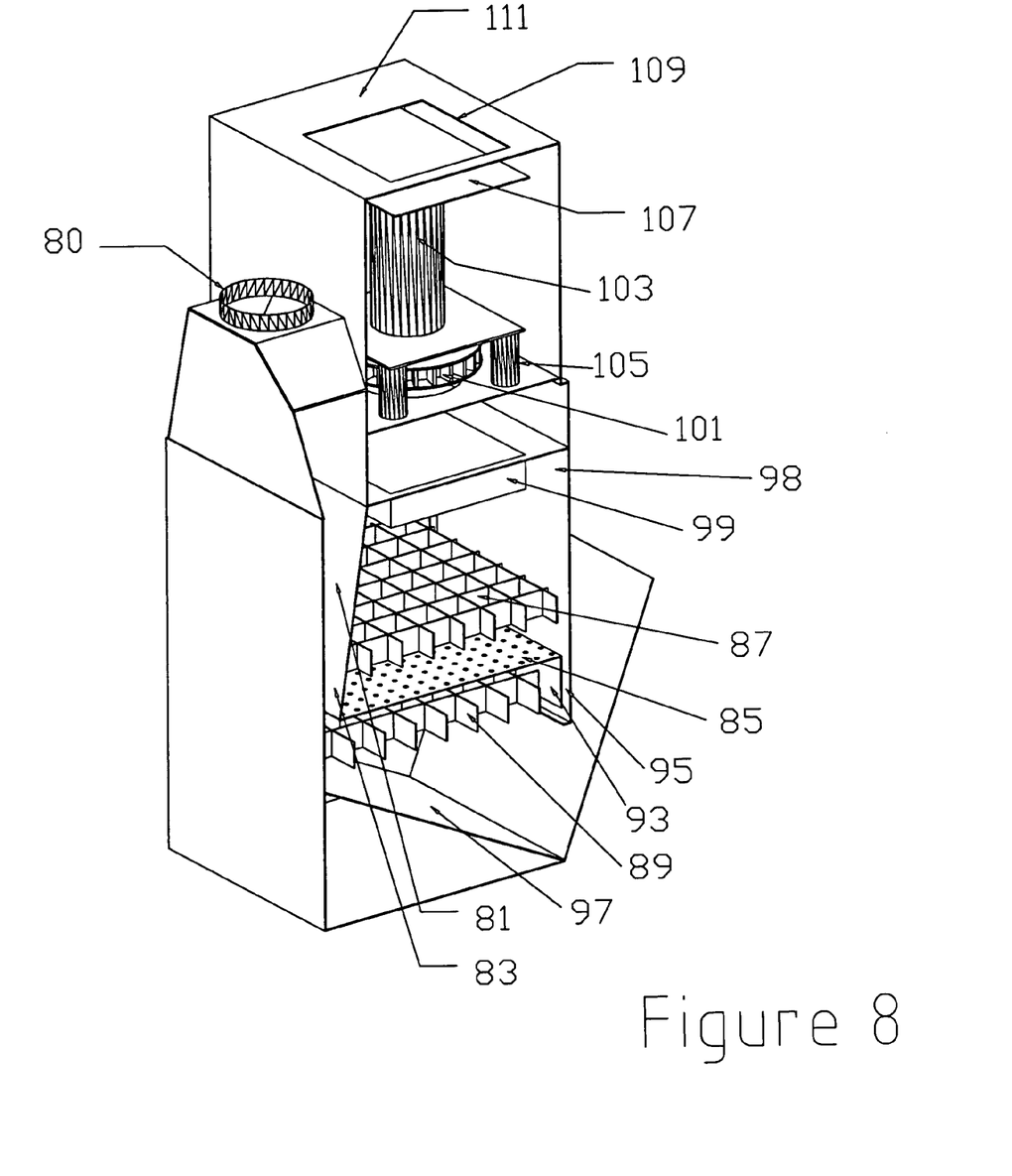
FIG. 8 provides a perspective view of a preferred embodiment of the invention, with its side wall removed, so as to reveal the internal components of the apparatus.

FIG. 8 provides a perspective view of the device of the invention, with the side wall removed, so as to show the internal components. Inlet collar 80 provides a means of connection for a pipe (not shown) which conveys the air to be cleaned. Inlet channel 81 is bounded in part by inlet ramp 83. The inlet ramp is tapered as shown, so as to constrict the flow through the inlet channel and so as to allow an increased useful surface area of the perforated sheet 85. Upper wave breaks 87 are positioned above the sheet, and lower wave breaks 89 sit below the sheet. As described above, the lower wave breaks are positioned so that they are immediately below the operating level of water in the reservoir, after the water has been drawn over the top surface of the perforated sheet. Access door 98 and flange 93, attached to the perforated sheet, together define liquid transfer channel 95.

A sludge ramp 97 causes sludge to accumulate near the access door 98, i.e. on the right-hand side as shown in FIG. 8. The sludge ramp preferably should be as steep as practicable, so that the sludge readily falls to the desired side by gravity. The sludge ramp therefore comprises means for directing sludge to a collection point. Because the sludge accumulates primarily at this collection point, the sludge can easily be raked away or otherwise removed. Delivering the sludge preferentially to a known location also facilitates the use of automatic sludge removal means, which could be added to the device shown.

Mist eliminator 99 removes mist from the output air stream, which is drawn upward through the device by fan 101. The fan is part of an assembly that includes motor 103 and vibration isolators 105. Silencer baffle 107 is located above the motor, and below outlet opening 109 that is formed in the top section 111. The silencer baffle preferably has an area that is slightly greater than that of the opening 109, and preferably sits about two inches below the level of the top section. The silencer baffle has the function of reducing noise from the system. In the preferred embodiment, the entire fan cabinet and the silencer baffle are lined with sound-absorbing material. This material should be fire-resistant, and should be chosen with regard to the principal audio frequencies generated by the fan.

In one example of a preferred construction of the present invention, in which the total height of the device of FIG. 8 is about 7–8 feet, and in which the "footprint" of the device is roughly 3×3 feet, the perforated sheet has holes having a diameter of 0.25 inches, and about 6% of the area of the sheet is taken up by the holes. The invention is not limited to this configuration, however, and other dimensions or ratios can be used.

The formula for determining the pressure drop across the perforated sheet is:

$$\Delta P = 1.78(V)^2/4005^2$$

where $\Delta P$ is pressure measured in inches water gauge, and

V is velocity in feet per minute through the holes.

Furthermore, $V=Q/A$, where Q is air flow in cubic feet per minute, and A is the area of the holes in square feet.

In one example, suppose that the air flow rate is 1000 cfm, and that there are 367 circular holes each having a diameter of 0.25 inches. The above formula shows that the pressure drop is about 7.12 inches water gauge.

The size of the holes in the perforated sheet depends on various design criteria. In general, smaller holes will produce smaller bubbles, which will have a greater total surface area, and thus will have better contact with the water, thereby improving the efficiency of the scrubbing. However, smaller holes are more apt to clog, especially when filtering fibrous dust such as from a buffing operation. The optimum hole size may therefore depend, in part, on the particular application. Gases, water-soluble materials, and fine powders may be suitable for filtering with smaller holes, while fibers may require filtration with larger ones. In general, larger holes may be necessary when it is anticipated that the contaminants are likely to clog the holes.

Also, smaller holes are more susceptible to the effects of surface tension. If the holes become very tiny, of the order of pin holes, the formula given above breaks down, because the water does not allow a bubble to form. The surface tension prevents the bubble from forming, and additional static pressure is required to pull the bubble through. Moreover, the surface tension changes as the water becomes more contaminated.

Thus, for a given application, a smaller hole size is preferred, for reasons of efficiency, but the size of the holes should not be reduced beyond the point at which the the flow is adversely affected.

The wave breaks are formed of baffles which define squares as shown. It has been found, for an apparatus having the overall size described in the above example, that if such squares are formed with sides having a length of about six inches, the wave breaks will perform satisfactorily. In general, a larger number of baffles is preferred, though the cost of the apparatus will increase with the number of such baffles. Again, the dimensions of the baffles defining the wave breaks should not be interpreted to limit the invention; many other sizes could be used instead. A preferred material for the baffles is stainless steel.

The invention is not limited to use in removing solid particulates. The invention can also remove liquid or gaseous contaminants from a gaseous medium, using the same structure and methodology described above. More generally, the materials being removed from the gaseous medium need not even be considered contaminants, but could be any component which is desired to be removed.

The invention can be modified in various ways. The sizes and relative dimensions of the components can be varied. The configuration of the holes in the perforated sheet could be changed. These and other modifications, which will be apparent to the reader skilled in the art, should be considered within the spirit and scope of the following claims.

What is claimed is:

1. Apparatus for removing materials from a gas stream, comprising:
   a) a reservoir for liquid,
   b) an inlet channel in fluid communication with the reservoir,
   c) a perforated sheet located above the reservoir, wherein the perforated sheet defines an inlet area below the sheet and an outlet area located above the sheet, the outlet area and the inlet area of the perforated sheet being free of any barrier in contact with the sheet except at ends of the sheet, the perforated sheet being positioned such that substantially all fluid flowing from said inlet channel passes from the region below the sheet, through perforations in the sheet and into the outlet area, and
   d) a liquid transfer channel, the liquid transfer channel being located between an end of the perforated sheet and an exterior wall of the reservoir, the liquid transfer channel comprising a sole path for fluid flow between the reservoir and the outlet area except for fluid flow through the perforations, and wherein the perforated sheet is free of any barrier, in contact with the sheet, in the outlet area, to fluid flow into the liquid transfer channel,
   wherein a pressure difference between the outlet area and the inlet channel comprises a sole means for moving liquid from the reservoir into the outlet area.

2. The apparatus of claim 1, wherein the apparatus has no pump for conveying liquid.

3. The apparatus of claim 1, further comprising a blower for conveying gas through the apparatus.

4. The apparatus of claim 3, wherein the blower is configured to push gas into the inlet channel and into the reservoir.

5. The apparatus of claim 3, wherein the blower is configured to pull gas out of the outlet area.

6. The apparatus of claim 1, wherein the inlet channel includes an inlet ramp which constricts the inlet channel.

7. The apparatus of claim 6, wherein the inlet ramp defines a point of maximum constriction, and wherein the perforated sheet extends to said point of maximum constriction.

8. The apparatus of claim 1, further comprising a plurality of wave breaks located within the reservoir, and under the perforated sheet.

9. The apparatus of claim 8, further comprising a plurality of wave breaks located above the perforated sheet.

10. The apparatus of claim 1, further comprising a sludge ramp located within the reservoir, the sludge ramp comprising means for directing sludge to a collection point.

11. The apparatus of claim 1, further comprising an outlet opening, and a silencer baffle located below the outlet opening.

12. Apparatus for removing materials from a gas stream, comprising:
   a) a reservoir for liquid,
   b) a perforated sheet located above the reservoir, the sheet defining an upper region above the sheet and a lower region below the sheet, the upper region and the lower region being substantially unobstructed by any barrier in contact with the sheet except at ends of the sheet,
   c) a liquid transfer channel, the liquid transfer channel being located between an end of the perforated sheet and an exterior wall of the reservoir, the liquid transfer channel comprising a sole path for fluid flow between the reservoir and the upper region except for fluid flow through perforations in the sheet, and wherein the perforated sheet is free of any barrier, in contact with the sheet, in the upper region, to fluid flow into the liquid transfer channel, and
   d) means for conveying a gas towards the reservoir and through the perforated sheet, wherein the conveying means comprises means for directing gas from the lower region, through the sheet, and into the upper region,
   wherein a pressure difference between the upper and lower region comprises a sole means for moving liquid from the reservoir into a region above the perforated sheet.

13. Apparatus for removing materials from a gas stream, comprising:
   a) a housing defining an inlet channel and a reservoir, the inlet channel being in fluid communication with the reservoir,
   b) a perforated sheet located above the reservoir, the sheet defining an upper region above the sheet and a lower region below the sheet, the upper region and the lower region being substantially unobstructed by any barrier in contact with the sheet except at ends of the sheet,
   c) a liquid transfer channel, the liquid transfer channel being located between an end of the perforated sheet and an exterior wall of the reservoir, the liquid transfer channel comprising a sole path for fluid flow between the reservoir and the upper region except for fluid flow through perforations in the sheet, and wherein the perforated sheet is free of any barrier, in contact with the sheet, in the upper region, to fluid flow into the liguid transfer channel, d) a plurality of wave breaks positioned above and below the perforated sheet, and e) a fan for moving gas from the inlet channel to the lower region, through the sheet, and into the upper region.

14. The apparatus of claim 13, wherein a pressure difference between the upper and lower regions comprises a sole means for moving liquid from the reservoir to the upper region.

15. The apparatus of claim 14, further comprising a sludge ramp located within the reservoir, the sludge ramp comprising means for directing sludge to a collection point.

16. The apparatus of claim 14, further comprising an outlet opening, and a silencer baffle located below the outlet opening.

17. A method of removing materials from a gas stream, comprising conveying a gas stream containing materials to be removed into a reservoir containing a liquid, the reservoir being located below a perforated sheet, the sheet defining an upper region above the sheet and a lower region below the sheet, the upper region and the lower region being substantially unobstructed by any barrier in contact with the sheet except at ends of the sheet, the reservoir being in fluid communication with the upper region through a liquid transfer channel that is narrower than the reservoir, the liquid transfer channel being located between an end of the perforated sheet and an exterior wall of the reservoir, the liquid transfer channel comprising a sole path for fluid flow between the reservoir and the upper region except for fluid flow through perforations in the sheet, and wherein the perforated sheet is free of any barrier, in contact with the sheet, in the upper region, to fluid flow into the liquid transfer channel, wherein the gas stream is conveyed, from the lower region, through the sheet, and into the upper region, at a rate such that a pressure drop induced by flow of gas through the perforated sheet is sufficient to cause liquid to rise from the reservoir and to cover the perforated sheet.

18. The method of claim 17, wherein liquid is conveyed through the liquid transfer channel without assistance from a pump.

19. A method of scrubbing a gas, comprising directing gas to be scrubbed through a perforated sheet located above a reservoir containing a liquid, the sheet defining an upper region above the sheet and a lower region below the sheet, the upper region and the lower region being substantially unobstructed by any barrier in contact with the sheet except at ends of the sheet, wherein the reservoir is in fluid communication with the upper region through a liquid transfer channel, the liquid transfer channel being located between an end of the perforated sheet and an exterior wall of the reservoir, the liquid transfer channel comprising a sole path for fluid flow between the reservoir and the upper region except for fluid flow through perforations in the sheet, and wherein the perforated sheet is free of any barrier, in contact with the sheet, in the upper region, to fluid flow into the liquid transfer channel, wherein the gas is directed, from the lower region, through the sheet, and into the upper region, at a rate sufficient to induce a pressure drop across the sheet sufficient to cause liquid from the reservoir to flow through the liquid transfer channel and to flood the sheet.

20. The method of claim 19, wherein liquid flows through the liquid transfer channel without assistance from a pump.

* * * * *